(12) United States Patent
Aryattawanich et al.

(10) Patent No.: US 8,862,455 B2
(45) Date of Patent: Oct. 14, 2014

(54) CREATING AND IMPLEMENTING LANGUAGE-DEPENDENT STRING PLURALIZATIONS

(75) Inventors: Thiti Wang Aryattawanich, Sammamish, WA (US); Brian Charles Blomquist, Lynnwood, WA (US); David Chiu, Issaquah, WA (US); Catherine Mary Pidgeon, Seattle, WA (US); Jyothi Mathew, Redmond, WA (US); Brian Gardner Jeans, Snoqualmie, WA (US); Lawrence Michael Sanchez, II, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 13/103,916

(22) Filed: May 9, 2011

(65) Prior Publication Data

US 2012/0290284 A1    Nov. 15, 2012

(51) Int. Cl.
*G06F 17/28*    (2006.01)
(52) U.S. Cl.
USPC .................................. 704/2; 704/9; 704/277

(58) Field of Classification Search
USPC ............... 704/1–10, 251, 255, 257, 270, 277
See application file for complete search history.

(56) References Cited

U.S. PATENT DOCUMENTS

2006/0100847 A1 *    5/2006   McEntee et al. .................. 704/4

* cited by examiner

*Primary Examiner* — Huyen X. Vo
(74) *Attorney, Agent, or Firm* — Louise Bowman; Peter Taylor; Micky Minhas

(57) ABSTRACT

Embodiments are directed to applying appropriate pluralization rules to text strings and to generating pluralization rules for multiple different languages. In an embodiment, a computer system identifies a user interface (UI) text string that includes a numerical amount for which an appropriate pluralization form is to be determined. The string is represented by a resource identifier (ID). The computer system receives an indication indicating which language the text string is to be displayed in and determines an appropriate resource ID from a set of pre-generated resource IDs based on the numerical amount and the determined language. The pre-generated resource IDs include various language-specific pluralization forms for localization of the text string. The computer system also returns the localized text string at the determined appropriate resource ID to the UI for display. In this manner, the localized text string is presented with the numerical amount and proper pluralization in the indicated language.

20 Claims, 5 Drawing Sheets

| Resource ID | Text String |
|---|---|
| 401A Payment_Due_V1 | Your Payment Is Due In { 0 } Days.  402A |
| 401B Payment_Due_V2 | Your Payment Is Due In { 0 } Day.  402B |

*Figure 4*

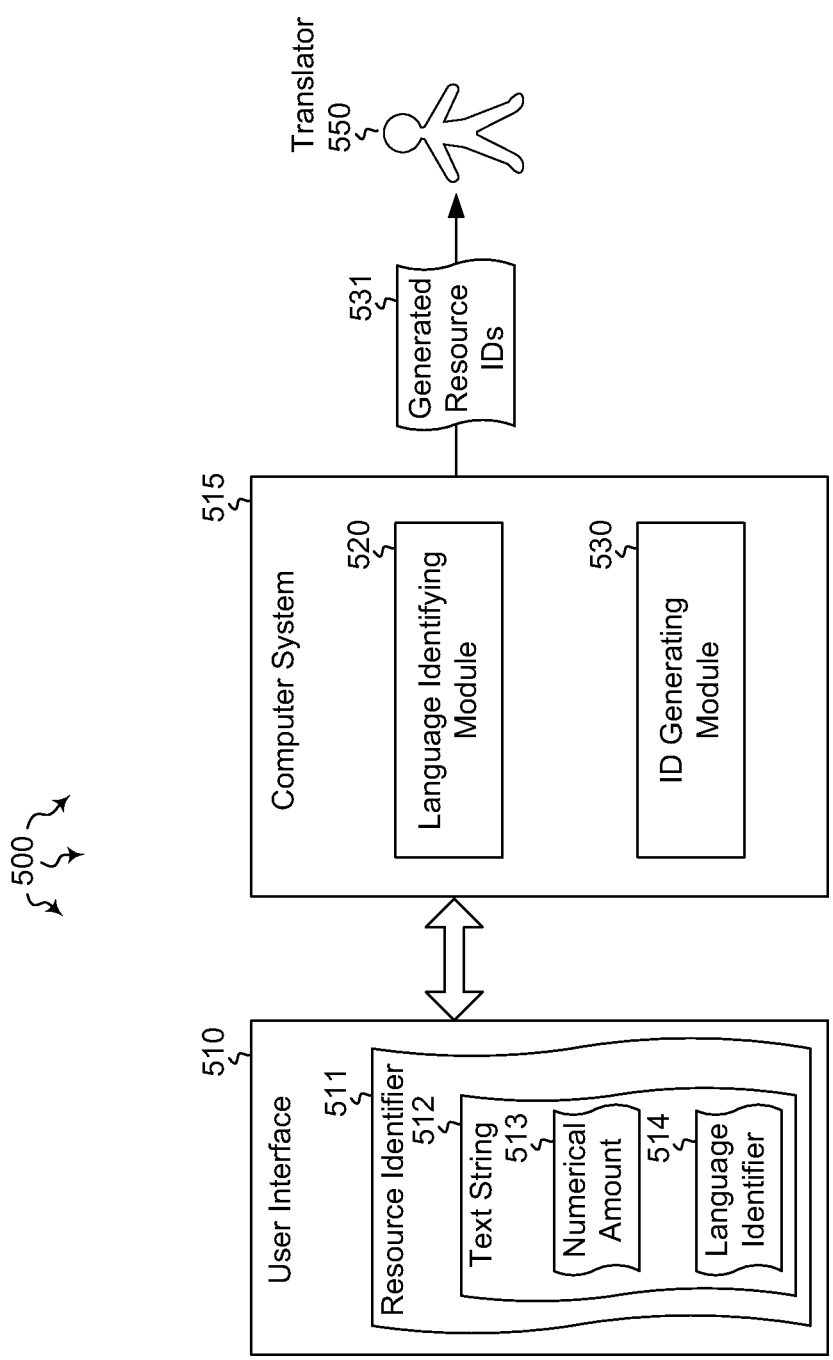

CREATING AND IMPLEMENTING LANGUAGE-DEPENDENT STRING PLURALIZATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are localized for certain countries. For example, applications may be translated into different languages, and otherwise changed to better fit the needs of a certain country or culture. These applications' user interfaces display program outputs to users in a variety of different languages. These program outputs often include item amounts. The use of item amounts necessitates proper pluralization for the nouns that go with the item amount. Different languages pluralize these nouns in a variety of different ways.

BRIEF SUMMARY

Embodiments described herein are directed to applying appropriate pluralization rules to text strings and to generating pluralization rules for multiple different languages. In one embodiment, a computer system identifies a user interface (UI) text string that includes a numerical amount for which an appropriate pluralization form is to be determined. The string is represented by a resource identifier (ID). The computer system receives an indication indicating which language the text string is to be displayed in and determines an appropriate resource ID from a set of pre-generated resource IDs based on the numerical amount and the determined language. The pre-generated resource IDs include various language-specific pluralization forms for localization of the text string. The computer system also returns the localized text string at the determined appropriate resource ID to the UI for display. In this manner, the localized text string is presented with the numerical amount and proper pluralization in the indicated language.

In another embodiment, a computer system accesses a resource identifier (ID) representing a user interface (UI) text string to determine a numerical amount for which a proper pluralization form is to be identified. The computer system generates string resource IDs for the corresponding UI text string. The string resource IDs include different pluralization forms that are to be used with specified numerical amounts in multiple different languages. The computer system also passes the generated string resource IDs to a translator for translation into a specified language. Each generated string resource ID includes information indicating which numerical amounts it is to be used with and which language it is to be used with.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates example resource IDs and their corresponding text strings.

FIG. 5 illustrates a computer architecture in which embodiments of the present invention may operate including generating pluralization rules for multiple different languages.

DETAILED DESCRIPTION

Figure 1:
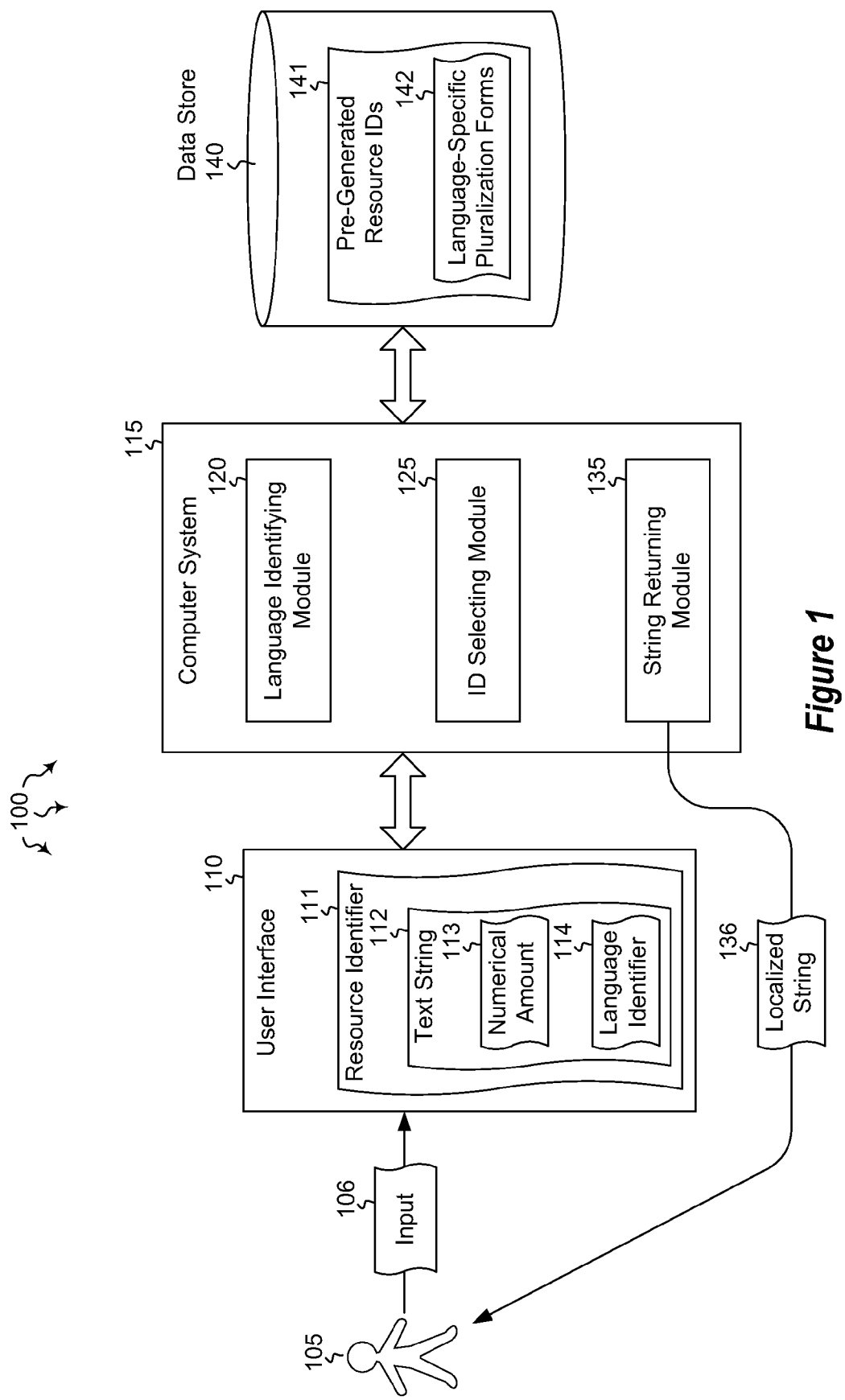
FIG. 1 illustrates a computer architecture in which embodiments of the present invention may operate including applying appropriate pluralization rules to text strings.

Embodiments described herein are directed to applying appropriate pluralization rules to text strings and to generating pluralization rules for multiple different languages. In one embodiment, a computer system identifies a user interface (UI) text string that includes a numerical amount for which an appropriate pluralization form is to be determined. The string is represented by a resource identifier (ID). The computer system receives an indication indicating which language the text string is to be displayed in and determines an appropriate resource ID from a set of pre-generated resource IDs based on the numerical amount and the determined language. The pre-generated resource IDs include various language-specific pluralization forms for localization of the text string. The computer system also returns the localized text string at the determined appropriate resource ID to the UI for display. In this manner, the localized text string is presented with the numerical amount and proper pluralization in the indicated language.

In another embodiment, a computer system accesses a resource identifier (ID) representing a user interface (UI) text string to determine a numerical amount for which a proper pluralization form is to be identified. The computer system generates string resource IDs for the corresponding UI text string. The string resource IDs include different pluralization forms that are to be used with specified numerical amounts in multiple different languages. The computer system also passes the generated string resource IDs to a translator for translation into a specified language. Each generated string resource ID includes information indicating which numerical amounts it is to be used with and which language it is to be used with.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 115. Computer system 115 may be any type of computer system including a desktop computer system, a laptop or other mobile computer system or a distributed or cloud computing system. The computer system may interact with other computer system, modules, interfaces or other items used in the computation process. For instance, the computer system may interact with data store 140. The data store may be any type of local, remote, distributed or other kind of data storing system. The data store may, in some embodiments, be a database that stores pre-generated resource IDs 141 and other items. The computer system may run various applications. These applications may have user interfaces (UIs) such as user interface 110. UI 110 may display text, images, videos or other items as part of its underlying application's execution. The UI may also be configured to receive user inputs 106 from various different computer users 105.

The computer system includes various different modules for performing specific tasks. For example, the language identifying module may identify (e.g. from language identifier 114) which language a given text string (e.g. 112) is to be displayed in. This information may be used in selecting or generating a resource identifier (ID). As used herein, the term "resource identifier" or "resource ID" may refer to an identifier for a text string or other resource. For instance, resource ID 111 may represent or correspond to text string 112. The resource ID may be a name or other type of identifier. The text string includes a numerical amount 113 for which a proper pluralization form is needed. For example, as shown in FIG. 4, text string 402A ("Your payment is due in {0} days") includes the numerical amount "{0}" and a corresponding noun ("days") for which the proper pluralization is needed. In English, if the number is zero or two or more, the properly pluralized noun will be "days". If the number is one, the properly pluralized noun will be "day". Each language, however, has different pluralization rules. For example, in French, if the number is zero or one, the noun takes a singular form. Accordingly, each language is handled in a manner specific to its own rules.

The resource ID generating module 130 in the computer system may generate multiple different resource IDs for different languages. These pre-generated resource IDs each have a corresponding language-specific pluralization form. Thus, when a specific numerical amount is encountered in a text string in a certain language, a corresponding pre-generated resource ID may be used with that string. These concepts will be explained in greater detail below with regard to methods 200 and 300 of FIGS. 2 and 3.

Figure 2:
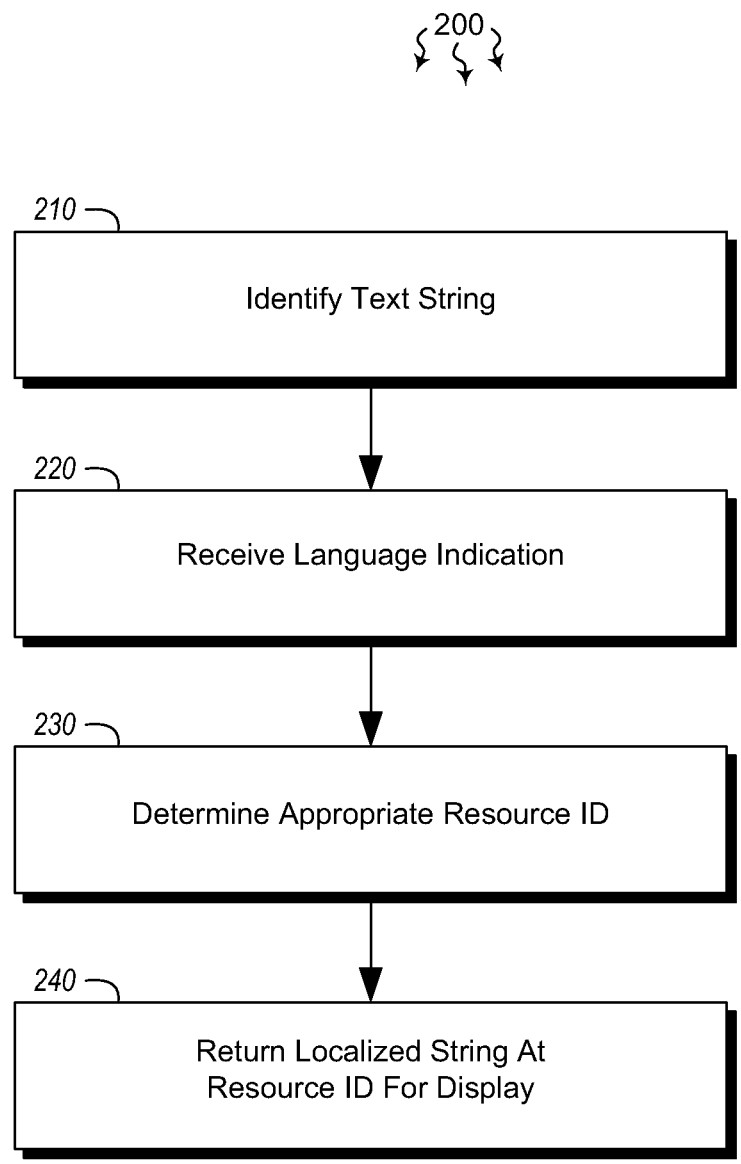
FIG. 2 illustrates a flowchart of an example method for applying appropriate pluralization rules to text strings.
Figure 3:
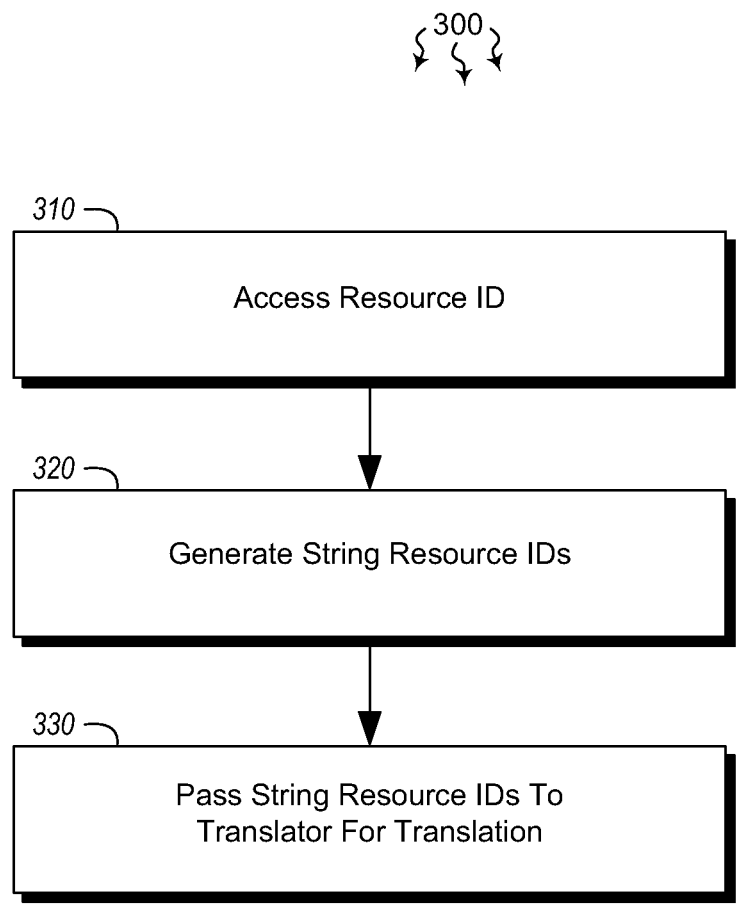
FIG. 3 illustrates a flowchart of an example method for generating pluralization rules for multiple different languages.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for applying appropriate pluralization rules to text strings. The method 200 will now be described with frequent reference to the components and data of environment 100.

Method 200 includes an act of identifying a user interface (UI) text string that includes a numerical amount for which an appropriate pluralization form is to be determined, the string being represented by a resource identifier (ID) (act 210). For example, computer system 115 may identify text string 112 in user interface 110. The text string includes one or more numerical amounts 113. Each noun in the text string that corresponds to a numerical amount has a proper pluralization form (plural or singular), based on what the numerical amount is and what language the text string is written in. Thus, method 200 includes receiving an indication indicating which language the text string is to be displayed in (act 220). In some cases, the text string language may be identified by accessing the user interface 110, accessing the language identifier 114, or accessing metadata associated with the user interface. The identified language may then be used to generate appropriate resource IDs or select from previously generated resource IDs.

Method 200 further includes an act of selecting an appropriate resource ID from a plurality of pre-generated resource IDs based on the numerical amount and the determined language, wherein the pre-generated resource IDs include language-specific pluralization forms for localization of the text string (act 230). For example, ID selecting module may select one of the pre-generated resource IDs 141 stored in the data store 140. The pre-generated resource ID may be chosen based on the numerical amount 113 and the language identified by module 120.

In some cases, the pre-generated resource IDs may be used by language translators to translate the resource IDs corresponding text string into a desired language. The correctly selected pre-generated resource ID will have the proper pluralization form for each possible numerical amount. In one embodiment, the pre-generated resource IDs may be tagged with an indicator indicating that only translators of that specific language are to use that pre-generated resource ID. In such cases, the resource ID is unlocked to that language so that localizers of the languages that have applicable pluralization rules can translate into those languages. In some cases, the proper pluralization form for the text string may include one or more different plural forms for each language. For instance, some languages have more than one plural form. For these languages, multiple different resource IDs with different plural forms are pre-generated.

Selecting an appropriate resource ID may include mapping the numerical amount to a corresponding pre-generated resource ID generated for that numerical amount. If no appropriate resource ID is selectable, a default pluralization resource ID is used. The default pluralization form may be singular or plural, depending on the language.

Method 200 also includes an act of returning the localized text string at the selected appropriate resource ID to the UI for display, such that the localized text string is presented with the numerical amount and proper pluralization in the indicated language (act 240). For example, string returning module 135 may return the localized string with pre-generated resource ID 141 determined by module 125 to UI 110. Then, at the UI, the text string 112 can be presented with the numerical amount 113 and the proper pluralization form in the language identified by module 120. Additionally or alternatively, the selected pre-generated resource IDs may be sent to translators for translation into specific languages. The translators for a given language may be limited to using the appropriately selected pre-generated resource IDs for translation.

In one example, each UI text string may be associated with a resource ID 111. For example, as shown in FIG. 4, resource ID 401A "Payment_Due_V1" contains a string 402A that says "Your payment is due in {0} days." where {0} is the number of days. Because pluralization forms in each language are different, application developers need to calculate the number of days so the numerical amount can be matched to a noun in appropriate pluralization form. As explained above, in English, if the numerical amount is zero (or two or more), the correct noun form would be "days". If the numerical amount is one, the correct pluralization form would be "day".

Continuing this example, the ID generating module 130 may generate resource IDs for each of the pluralization formats for a language family. Each of these resource IDs may be in different versions (e.g. "Payment_Due_V1" and "Payment_Due_V2"). The V1 and V2 suffixes may, in some cases, specify the rule that is to be applied (e.g. "is1", "is0or1", "is 2or12", etc.). Thus, in such cases, Payment_Due_is1 would be the resource ID for the text string 402B as that is the string with the singular form, matching the numerical amount (one) and the language (English). Many different suffixes may be used for the different rules. Alternatively, more abstract sequential naming schemes (e.g. V1, V2 in 401A and 401B) may be used.

To display the UI string correctly according to the number of days, the application developer will create two resource IDs (English has only one plural form and one singular form), and call a method that selects the proper plural form to be displayed according to the quantity and the UI language. In some cases, the default resource ID may be the plural form (e.g. 401A). In this case, if there is a resource string that has the suffix "_is1" (or V2), the computer system will create other varieties of resource strings to have the unit display correctly according to the grammatical rules in that language.

Many other resource IDs can be created for different languages and stored in a table. For example, in French, the singular format is for zero and one. In such cases, a resource ID can be generated that applies to French text strings. The resource ID may look like the following: "Payment_Due_is0or1", and the corresponding string may be: "Your payment is due in {0} day." The computer system can then unlock that resource to allow French translators (and translators of other languages to which the "is0or1" rule applies) to localize that text string. The French localization may look like the following after the localization process is done: ResourceID is "Payment_Due", text string is "Votre paiement est due en {0} jours.", ResourceID is "Payment_Due_is0or1", text string is "Votre paiement est due en {0} jour." A computer function takes the resource ID name, numerical amount and appropriate language, map to the proper resource ID (if the quantity is one and the UI language is English, it will map to Payment_Due_is1), and displays the result. If there is no matching resource ID, the default for that language is used.

Turning now to FIG. 3, FIG. 3 illustrates a flowchart of a method 300 for generating pluralization rules for multiple different languages. The method 300 will now be described with frequent reference to the components and data of environments 100 and 500 of FIGS. 1 and 5, respectively.

Method 300 includes an act of accessing a resource identifier (ID) representing a user interface (UI) text string to determine a numerical amount for which a proper pluralization form is to be identified (act 310). For example, computer system 515 may access resource identifier 511 which represents UI (510) text string 512. The resource ID may be accessed to determine which numerical amount 513 is to be used for finding an appropriate pluralization form. The language identifying module 520 may be used to identify which language the text string is to be displayed in.

Method 300 next includes an act of generating one or more string resource IDs for the corresponding UI text string, wherein the string resource IDs include different pluralization forms to be used with specified numerical amounts in multiple different languages (act 320). For example, ID generating module 530 may generate various different string resource IDs 531 for the text string 512 and store them in data store 141 of FIG. 1. Each generated string resource ID is marked as being applicable only to a specified list of languages. As mentioned above, each resource ID complies with a certain rule. Many languages have different pluralization rules, but some languages share rules. As such, a resource ID may be marked as being applicable with all the languages that follow that specific rule (e.g. "is1"). The string resource ID is then translated using rules that are appropriate for the text string's corresponding language.

Each language may have its own default resource ID. This default ID may correspond to whichever rule in that language is used most often (in English, it would be the plural form which applies to any number other than one). The default resource ID may be used for translation in a given language if no other resource IDs are available in that language. Each generated string resource ID is stored in a reference table. From that table, the generated string resource IDs may be mapped according to the numerical amount and language used.

Method 300 includes an act of passing one or more of the generated string resource IDs to a translator for translation into a specified language, wherein each generated string resource ID includes information indicating the one or more numerical amounts it is to be used with and the language it is to be used with (act 330). For example, computer system 515 may pass the generated, localized text string with its corresponding resource ID (e.g. 531) to a translator 550 to be translated into a given language. The resource ID itself may contain metadata, tags, a proper suffix or other identification mechanism to indicate which numerical amounts and language it is to be used with. The translator may translate the string resource ID that is determined to be appropriate for the numerical amount and language, after which the UI may receive from the translator the properly translated string resource ID. The text string corresponding to the translated string resource ID may then be displayed in the UI.

Accordingly, methods, systems and computer program products are provided which apply appropriate pluralization rules to user interface text strings. Moreover, methods, systems and computer program products are provided which generate and store pluralization rules and corresponding resource IDs for multiple different languages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for applying appropriate pluralization rules to text strings, the method comprising:
    an act of the processor identifying a user interface (UI) text string that includes a numerical amount for which an appropriate pluralization form is to be determined, the string being represented by a resource identifier (ID);
    an act of receiving an indication indicating which language the text string is to be displayed in;
    an act of selecting an appropriate resource ID from a plurality of pre-generated resource IDs based on the numerical amount and the determined language, wherein the pre-generated resource IDs include language-specific pluralization forms for localization of the text string, at least one of the pre-generated resource IDs including a language-specific pluralization form that applies to a plurality of languages including the indicated language and at least one other language; and
    an act of returning the localized text string at the determined appropriate resource ID to the UI for display, such that the localized text string is presented with the numerical amount and proper pluralization in the indicated language.

2. The method of claim 1, wherein the selected appropriate resource ID is returned to the UI for display with multiple plural forms for different languages.

3. The method of claim 1, wherein at least one of the pre-generated resource IDs is tagged with an indicator indicating that only translators of that language are to use that pre-generated resource ID.

4. The method of claim 1, wherein the proper pluralization form includes one or more different plural forms for each language.

5. The method of claim 1, wherein one or more of the pre-generated resource IDs are sent to translators for translation into specific languages.

6. The method of claim 5, wherein translators for a given language are limited to using the pre-generated resource IDs for translation.

7. The method of claim 1, wherein the text string language is determined by accessing metadata corresponding to the UI.

8. The method of claim 1, wherein selecting an appropriate resource ID comprises mapping the numerical amount to a corresponding pre-generated resource ID generated for that numerical amount.

9. The method of claim 1, wherein if no appropriate resource ID is selectable, a default pluralization resource ID is used.

10. A computer program product for implementing a method for generating pluralization rules for multiple different languages, the computer program product comprising a computer-readable storage device having stored thereon computer-executable instructions that, when executed by one or more processors of the computing system, cause the computing system to perform the method, the method comprising:
   an act of accessing a resource identifier (ID) representing a user interface (UI) text string to determine a numerical amount for which a proper pluralization form is to be identified;
   an act of generating one or more string resource IDs for the corresponding UI text string, wherein the string resource IDs include different pluralization forms to be used with specified numerical amounts in multiple different languages, at least one of the generated string resource IDs including a language-specific pluralization form that applies to a plurality of languages including the indicated language and at least one other language; and
   an act of passing one or more of the generated string resource IDs to a translator for translation into a specified language, wherein each generated string resource ID includes information indicating the one or more numerical amounts it is to be used with and the language it is to be used with.

11. The computer program product of claim 10, wherein each generated string resource ID is marked as being applicable only to a specified list of languages.

12. The computer program product of claim 11, wherein the string resource ID is translated using rules that apply to the string's corresponding language.

13. The computer program product of claim 10, wherein at least one of the string resource IDs comprises a default resource ID.

14. The computer program product of claim 13, wherein the default resource ID is used for translation in a given language if no other resource IDs are available in that language.

15. The computer program product of claim 10, further comprising the translator translating the string resource ID that is determined to be appropriate for the numerical amount and language.

16. The computer program product of claim 15, further comprising receiving from the translator the properly translated string resource ID.

17. The computer program product of claim 16, further comprising displaying the text string corresponding to the translated string resource ID in the UI.

18. A computer system comprising the following:
   one or more processors;
   system memory;
   one or more computer-readable storage media having stored thereon computer-executable instructions that, when executed by the one or more processors, causes the computing system to perform a method for generating pluralization rules for multiple different languages, the method comprising the following:
      an act of accessing a resource identifier (ID) representing a user interface (UI) text string to determine a numerical amount for which a proper pluralization form is to be identified;
      an act of generating one or more string resource IDs for the corresponding UI text string, wherein the string resource IDs include different pluralization forms to be used with specified numerical amounts in multiple different languages, at least one of the generated string resource IDs including a language-specific pluralization form that applies to a plurality of languages including the indicated language and at least one other language;
      an act of passing one or more of the generated string resource IDs to a translator for translation into a specified language, wherein each generated string resource ID includes information indicating the one or more numerical amounts it is to be used with and the language it is to be used with;
      an act of receiving from the translator the properly translated string resource ID; and
      an act of displaying the text string corresponding to the translated string resource ID in the UI.

19. The system of claim 18, wherein translators for a given language are limited to using the generated resource IDs for translation.

20. The system of claim 18, wherein each generated string resource ID is stored in a reference table, such that the generated string resource IDs are accessible for numerical amount and language mapping.

* * * * *